United States Patent Office 3,449,338
Patented June 10, 1969

3,449,338
CEPHALOSPORIN $C_A$ DERIVATIVES
Edwin H. Flynn, Indianapolis, Ind., assignor to Eli Lilly and Company, Indianapolis, Ind., a corporation of Indiana
No Drawing. Application Sept. 21, 1964, Ser. No. 398,028, which is a continuation-in-part of application Ser. No. 220,855, Aug. 31, 1962. Divided and this application Nov. 4, 1968, Ser. No. 773,287
Int. Cl. C07d 99/24
U.S. Cl. 260—243                      15 Claims

ABSTRACT OF THE DISCLOSURE

Thienyl and furyl cephalosporin $C_A$ derivatives useful as antibiotics, e.g., 7-($\alpha$-thienylacetamido)-3-pyridinomethyl-3-cephem-4-carboxylic acid (now known generically as cephaloridine).

CROSS REFERENCES

This application is a division of my pending application Ser. No. 398,028, filed Sept. 21, 1964, which application is a continuation-in-part of my application Ser. No. 220,855, filed Aug. 31, 1962, now U.S. Patent 3,218,318, issued Nov. 16, 1965, and of my application Ser. No. 273,556, filed Apr. 17, 1963, now abandoned, which applications were continuations-in-part of my application Ser. No. 115,612, filed June 8, 1961, with which Ser. Nos. 220,855 and 273,556 were copending.

DETAILED DESCRIPTION OF THE INVENTION

This invention relates to novel organic compounds and to methods for their preparation. The novel compounds of the present invention are members of the class of the cephalosporin $C_A$ compounds, of which cephalosporin $C_A$ itself is the prototype:

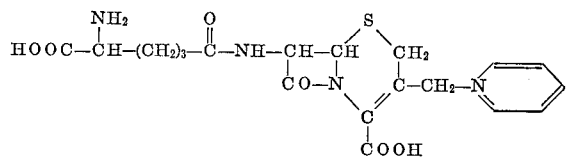

The novel compounds are represented by the following formula:

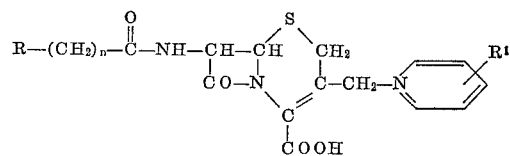

where R is a $\alpha$-thienyl, $\beta$-thienyl, $\alpha$-furyl, or $\beta$-furyl; $n$ is 0 or 1; $R^1$ is hydrogen or a substituent at the 3 or 4 position of the pyridine ring, selected from the group consisting of methyl, ethyl, hydroxy, hydroxymethyl, trifluoromethyl, halo, cyano, carboxy, carbo($C_1$–$C_4$)alkoxy, ($C_1$–$C_4$)alkanoyl, ($C_1$–$C_4$)alkanoyloxy, and

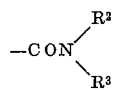

$R^2$ is hydrogen, methyl, ethyl, or cyclopropyl; and $R^3$ is hydrogen, methyl, or ethyl; and the salts thereof with pharmaceutically acceptable acids.

Illustrations of the radicals appearing in the above formula are the following: For halo—fluoro, chloro, bromo, and iodo. For carboalkoxy—carbomethoxy, carbethoxy, carbopropoxy, carbo-n-butoxy, carbo-sec.-butoxy, carbo-t-butoxy, and the like. For alkanoyl—acetyl, propionyl, butyryl, isobutyryl, and the like. For alkanoyloxy—acetoxy, propionoxy, n-butyroxy, isobutyroxy, and the like. The carbamyl group,

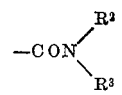

may be unsubstituted, monosubstituted, or disubstituted, as defined, and in the disubstituted embodiments, the substituents may be the same or different.

In naming the novel compounds of the invention, it is convenient to designate the basic saturated fused-ring beta-lactam thiazine structure as "cepham,"

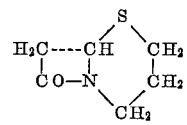

and to name the compounds as derivatives thereof, the term "cephem" referring to the basic structure with a single olefinic bond. According to this system, cephalosporin $C_A$ itself would be named 7-(5'-aminodipamido)-3-pyridinomethyl-3-cephem-4-carboxylic acid. More informally, it is convenient to consider the compounds as analogues of cephalosporin $C_A$ itself, and to specify the differences by naming the radical attached to the CO—NH— group in the 7 position and the pyridine compound employed to replace the acetoxy group in the 3 position. Thus, 7-($\alpha$-thienylacetamido)-3-(4'-carbamylpyridinomethyl) - 3 - cephem - 4 - carboxylic acid can be called "$\alpha$-thienylmethyl isonicotinamide cephalosporin $C_A$."

The following compounds are illustrative examples of the compounds lying within the scope of the present invention:

$\beta$-Thienylmethyl 3-butyrylpyridine cephalosporin $C_A$
$\alpha$-Furyl nicotinic acid cephalosporin $C_A$
$\beta$-Thienyl ethyl isonicotinate cephalosporin $C_A$
$\alpha$-Thienylmethyl sec.-butyl nicotinate cephalosporin $C_A$
$\alpha$-Thienyl 3-cyanopyridine cephalosporin $C_A$
$\alpha$-Furylmethyl 4-isobutyrylpyridine cephalosporin $C_A$
$\alpha$-Furyl n-propyl nicotinate cephalosporin $C_A$
$\alpha$-Furylmethyl 4-hydroxypyridine cephalosporin $C_A$
$\beta$-Furylmethyl 3-acetylpyridine cephalosporin $C_A$
$\beta$-Thienylmethyl 3-hydroxypyridine cephalosporin $C_A$
$\beta$-Furyl isonicotinic acid cephalosporin $C_A$
$\beta$-Furylmethyl N'-methylisonicotinamide cephalosporin $C_A$
$\alpha$-Thienylmethyl nicotinamide cephalosporin $C_A$
$\beta$-Thienyl 4-cyanopyridine cephalosporin $C_A$
$\alpha$-Furylmethyl N'-methylnicotinamide cephalosporin $C_A$
$\alpha$-Thienylmethyl 4-propionylpyridine cephalosporin $C_A$
$\alpha$-Thienyl methyl nicotinate cephalosporin $C_A$
$\beta$-Thienylmethyl isonicotinamide cephalosporin $C_A$
$\beta$-Furyl isobutyl isonicotinate cephalosporin $C_A$
$\beta$-Thienylmethyl pyridine cephalosporin $C_A$
$\alpha$-Furylmethyl 4-ethylpyridine cephalosporin $C_A$
$\alpha$-Thienyl pyridine cephalosporin $C_A$
$\beta$-Furylmethyl 4-picoline cephalosporin $C_A$
$\alpha$-Thienylmethyl N-cyclopropylisonicotinamide cephalosporin $C_A$ β-Furyl pyridine cephalosporin $C_A$
α-Thienylmethyl N-methyl-N-ethylisonicotinamide cephalosporin $C_A$
α-Furylmethyl 3-bromopyridine cephalosporin $C_A$
α-Thienylmethyl 4-bromopyridine cephalosporin $C_A$
α-Furylmethyl pyridine cephalosporin $C_A$
α-Thienylmethyl 3-ethylpyridine cephalosporin $C_A$
α-Thienylmethyl N,N-dimethylnicotinamide cephalosporin $C_A$
β-Furylmethyl pyridine cephalosporin $C_A$
α-Thienylmethyl 4-fluoropyridine cephalosporin $C_A$
α-Furylmethyl N-ethylisonicotinamide cephalosporin $C_A$
β-Furylmethyl 4-chloropyridine cephalosporin $C_A$
α-Thienylmethyl 3-acetoxypyridine cephalosporin $C_A$ and the salts thereof with pharmaceutically acceptable acids, illustratively the hydrochloride, hydrobromide, sulfate, nitrate, orthophosphate, and naphthalenesulfonate salts, and the like.

The compounds of the present invention are readily prepared from the analogous cephalosporin C compound, having the desired acylamido group in the 7 position and the characteristic acetoxymethyl group in the 3 position, by commingling in aqueous solution with an excess of the appropriate substituted pyridine and allowing to react at elevated temperature. The reaction is suitably carried out at around pH 3–8.5, preferably pH 6–7, and at a temperature from about 40 to about 100° C., preferably around 50–75° C. Under the preferred conditions, a reaction time of 4 to 8 hours is generally sufficient. Lower temperatures require longer times, while higher temperatures tend to cause product degradation. The cephalosporin C compound can be used in the form of the free acid or a salt. The pyridine compound should be used in at least equimolar ratio to the cephalosporin C compound, and preferably in an excess of 10 to 100 percent or more (e.g., around 30 percent excess), in order to maximize the conversion of the cephalosporin C compound, the excess being readily recoverable for reuse. Under the reaction conditions, the acetoxy group is split off and replaced by the substituted pyridine compound, the attachment of the latter to the residual methylene group being directly to the ring nitrogen atom, forming a quaternary ammonium derivative, which in turn forms an inner salt with the carboxyl in the 4 position.

In an improved method, developed by Harvey M. Higgins, Jr., now U.S. Patent 3,270,012, issued Aug. 30, 1966, the reaction is accelerated and the reactants and products are stabilized by incorporating in the reaction mixture a water-soluble thiocyanate salt, for example, potassium thiocyanate, sodium thiocyanate, ammonium thiocyanate, or the like. The thiocyanate salt is desirably added in at least about equimolar ratio to the cephalosporin C compound, and preferably in a molar ratio of 2:1 to 10:1 or more. Larger quantities are not detrimental to the reaction or products, but tend eventually to complicate the recovery process. It is generally found that the advantages of the thiocyanate salt are fully realized by employing the salt in approximately an equal proportion by weight to the cephalosporin C compound.

The desired product can be isolated from the reaction product mixture by evaporation to dryness under vacuum, triturating with acetone to remove starting materials, and repeatedly precipitating from aqueous solution by addition of acetone. In many cases, the product can be crystallized directly from aqueous solution by dissolving in water at elevated temperature and then cooling.

In a preferred recovery method, the aqueous reaction product mixture is first contacted with an organic amine anion exchanger, used in the form of its salt with acetic acid, propionic acid, citric acid, tartaric acid, or other weak organic acid. Suitable exchangers are the liquid resins Amberlite LA–1 or LA–2. These materials are desirably used as a solution ranging from about 5 to about 35 percent concentration in a nonsolvent for the cephalosporin $C_A$ product. An especially desirable carrier is methyl isobutyl ketone, which is a solvent for the anion exchanger and for the starting materials, but not for the product. After one or two treatments with such a material, it is frequently found that the product crystallizes directly from the purified aqueous solution, although concentrating, cooling, and seeding are sometimes necessary.

The desired cephalosporin C starting material is readily prepared by acylating 7-aminocephalosporanic acid with an acylating agent having the desired structure under conventional conditions. A convenient acylating agent is the appropriate thienyl- or furyl-substituted acyl chloride or bromide. The acylation is carried out in water or in an appropriate organic solvent, preferably under substantially neutral conditions, and preferably at reduced temperature, i.e., above the freezing point of the reaction mixture and up to about 20° C. In a typical procedure, 7-aminocephalosporanic acid is commingled with aqueous 50 volume-percent acetone and a sufficient quantity of sodium bicarbonate to promote solution, the concentration of 7-aminocephalosporanic acid being about 1 to about 4 percent by weight. The solution is cooled to around 0 to 5° C., and a solution of the acylating agent is added in about 20 percent excess, with stirring and cooling. The mixture is then allowed to warm to room temperature, after which it is acidified to around pH 2 and extracted with ethyl acetate or other immiscible organic solvent. The ethyl acetate extract is adjusted to around pH 4.5 with potassium hydroxide or other base, and is extracted with water. The water solution is separated and evaporated to dryness. The residue is taken up in the minimum quantity of water, and the acylated product is precipitated by adding a large excess of acetone and, if necessary, ether. The crystalline material obtained thereby is filtered, washed with acetone, and dried.

Acylation of the 7-amino group can also be carried out with the appropriate carboxylic acid, employed in conjunction with an equimolar proportion or more of a carbodiimide, and the acylation proceeds at ordinary temperatures in such cases. Any of the carbodiimides are effective for this purpose, the active moiety being the —N=C=N— structure. Illustrative examples include N,N'-diethylcarbodiimide, N,N'-di-n-propylcarbodiimide, N,N'-diisopropylcarbodiimide, N,N'-dicyclohexylcarbodiimide, N,N'-diallylcarbodiimide, N,N' - bis(p - dimethylaminophenyl)carbodiimide, N - ethyl-N'-(4" - ethylmorpholinyl)carbodiimide, and the like, other suitable carbodiimides being disclosed by Sheehan in U.S. Patent No. 2,938,892 (May 31, 1960) and by Hofmann et al. U.S. Patent No. 3,065,224 (Nov. 20, 1962).

Alternatively, the acylation of the 7-amino group can be carried out with an activated derivative of the appropriate carboxylic acid, suitably the corresponding acid anhydride, or a mixed anhydride, or the azide, or an activated ester. Other suitable derivatives can readily be ascertained from the art.

The compounds of the present invention can also be prepared by reacting 7-aminocephalosporanic acid with the appropriate substituted pyridine compound under the conditions described above, then subjecting the quaternized intermediate (which can be considered the nucleus of a cephalosporin $C_A$ analogue) to the acylation according to any of the procedures described above.

In a further alternative method, cephalosporin C is reacted with the appropriate substituted pyridine compound to form the corresponding cephalosporin $C_A$ analogue, the latter is subjected to cleavage to remove the 5-aminoadipyl side chain, yielding the nucleus of the cephalosporin $C_A$ analogue, and the latter is acylated according to any of the procedures described above. The cleavage reaction is preferably carried out by exposing the cephalosporin $C_A$ analogue to the action of nitrosyl chloride or other nitrosating agent in substantially anhydrous formic acid solution at a temperature around 20 to 30° C.

The invention will be more readily understood from the following operating examples, which are submitted as illustrations only, and not by way of limitation. The antibiotic potencies reported herein were determined against *Staphylococcus aureus* 209P by an appropriate modification of the paper disc plate methods of Higgens et al., Antibiotics and Chemotherapy, 3, 50–54 (January 1953), and Loo et al., Journal of Bacteriology, 50, 701–709 (1945).

Example 1.—α-Thienylmethyl isonicotinamide cephalosporin $C_A$

A mixture of 101 g. of 7-(α-thienylacetamido)cephalosporanic acid sodium salt, 200 g. of isonicotinamide, and 1 liter of water was heated 40 hours at 37.5° C., and was then evaporated to dryness under vacuum. The residue was triturated three times with acetone (10 liters, 5 liters, and 5 liters). The acetone-insoluble material, weighing 105 g., was triturated with 300 ml. of water, warmed slightly, cooled, and filtered. The water-insoluble material was stirred with 700 ml. of acetone, then collected and air dried. The product thus obtained, weighing 32 g., was dissolved in hot water and recrystallized. Yield, 18.4 g. of 7-(α-thienylacetamido)-3-(4′-carbamylpyridinomethyl)-3-cephem-4-carboxylic acid melting at 147–150° C. with decomposition, and having maxima in its ultraviolet absorption at 233 and 262 mμ ($\epsilon$=16,650 and 13,550, respectively).

A recrystallized sample of the product compound had an antibiotic potency of 690 penicillin G units per milligram. The product was found to be stable in solution (10 micrograms per milliliter) in 0.1 M phosphate buffer in the range pH 4.5–7.5 at 4° C. for one month.

Example 2.—α-Thienylmethyl nicotinamide cephalosporin $C_A$ 7-(α-thienylacetamido)cephalosporanic acid sodium salt (1.0 g.) and nicotinamide (2.0 g.) were dissolved in 50 ml. of water. The resulting solution was adjusted to pH 2.5 with 1 N hydrochloric acid and heated for 18 hours at 40° C. The mixture was thereafter evaporated to dryness under vacuum. The residue was triturated twice with acetone (100 ml. and 50 ml.). The acetone-insoluble material was dissolved in 3.5 ml. of water and reprecipitated by adding 36.5 ml. of acetone. The solids were triturated with 40 ml. of acetone and dried under reduced pressure. Yield, 420 mg. of impure 7-(α-thienylacetamido)-3-(3′-carbamylpyridinomethyl)-3-cephem-4-carboxylic acid, having an antibiotic potency of 260 penicillin G units per milligram. A recrystallized preparation had an antibiotic potency of 756 penicillin G units per milligram, with maxima in its ultraviolet absorption spectrum at 235 and 260 mμ ($\epsilon$=14,200 and 12,300, respectively).

Example 3.—α-Thienylmethyl 3-hydroxypyridine cephalosporin $C_A$

A mixture of 25. g. of 7-(α-thienylacetamido)cephalosporanic acid sodium salt, 25 g. of potassium thiocyanate, and 25 g. of 3-hydroxypyridine in 125 ml. of water was adjusted to pH 6.5 with orthophosphoric acid, then heated to 60° C., at which temperature all of the materials went into solution, and heating was continued at 60° C. for 5 hours.

The reaction product mixture was cooled to room temperature and washed twice with 400-ml. portions of 25 percent Amberlite LA–1 (a liquid organic amine anion exchanger, used in the acetate form) in methyl isobutyl ketone. During and after the washing procedure, crystals of the product, 7-(α-thienylacetamido)-3-(3′-hydroxypyridinomethyl)-3-cephem-4-carboxylic acid, appeared in the aqueous phase, and were collected, washed with methyl isobutyl ketone, then with water, and dried. Yield, 6.5 g. of product having an antibiotic potency of 600 penicillin G units per milligram and maxima in its ultraviolet absorption spectrum at 235 and 256 mμ ($\epsilon$=16,000 and 12,100 respectively).

Example 4.—α-Thienylmethyl-3-(N′-methylcarbamyl) pyridine cephalosporin $C_A$ 7-(α-thienylacetamido) - 3-(3′- [N″- methylcarbamyl] pyridinomethyl)-3-cephem-4-carboxylic acid, 11.2 g., was prepared by the reaction of 25 g. of 7-(α-thienylacetamido)cephalosporanic acid sodium salt with 25 g. of 3-(N′-methylcarbamyl)pyridine in the presence of 25 g. of potassium thiocyanate according to the procedure of Example 3. The product had maxima in its ultraviolet absorption spectrum at 235 and 260 mμ ($\epsilon$=17,100 and 12,700 respectively) and an antibiotic potency of 880 penicillin G units per milligram.

Example 5.—α-Thienylmethyl 4-acetylpyridine cephalosporin $C_A$ 7-(α-thienylacetamido)-3-(4′-acetylpyridinomethyl) - 3-cephem-4-carboxylic acid, 9.2 g., was prepared by the reaction of 25 g. of 7-(α-thienylacetamido)cephalosporanic acid sodium salt with 25 g. of 4-acetylpyridine in the presence of 25 g. of potassium thiocyanate according to the procedure of Example 3. The product had maxima in its ultraviolet absorption spectrum at 231 and 260 mμ ($\epsilon$=approximately 17,300 and approximately 10,600, respectively) and an antibiotic potency of 540 penicillin G units per milligram.

Example 6.—α-Thienylmethyl 4 - (N′ - methylcarbamyl) pyridine cephalosporin $C_A$ 7-(α-thienylacetamido)-3-(4′ - [N″-methylcarbamyl] pyridinomethyl)-3-cephem-4-carboxylic acid, 10.5 g., was prepared by the reaction of 20 g. of 7-(α-thienylacetamido)cephalosporanic acid sodium salt with 20 g. of 4-(N′-methylcarbamyl)pyridino in the presence of 20 g. of potassium thiocyanate according to the procedure of Example 3. The product had maxima in its ultraviolet absorption spectrum at 233 and 264 mμ ($\epsilon$=14,600 and 13,200 respectively), and an antibiotic potency of 740 penicillin G units per milligram.

Example 7.—α-Thienylmethyl 4-cyanopyridine cephalosporin $C_A$ 7-(α-thienylacetamido)-3-(4′ - cyanopyridinomethyl)-3-cephem-4-carboxylic acid, 4 g., was prepared by the reaction of 20 g. of 7-(α-thienylacetamido)cephalosporanic acid sodium salt with 10 g. of 4-cyanopyridine in the presence of 100 g. of potassium thiocyanate according to the procedure of Example 3. The product had maxima in its ultraviolet absorption spectrum at 231 and 266 mμ ($\epsilon$=22,700 and 12,450, respectively), and an antibiotic potency of 750 pencillin G units per milligram.

Example 8.—α-Thienylmethyl 4-carbomethoxypyridine cephalosporin $C_A$ 7-(α-thienylacetamido)cephalosporanic acid sodium salt (25 g.) was dissolved in 250 ml. of water, and to the solution were added 50 g. of methyl isonicotinate. The mixture was heated at 37° C. for 41 hours, and was then evaporated to dryness under vacuum. The residue was triturated four times with 1250-ml. portions of acetone, then dried under vacuum. Yield, 18.13 g.

The impure product was dissolved in 40 ml. of water and the solution was cooled. The solids thus produced were filtered off (approximately 4 g.), recrystallized from 40 ml. of water, triturated with 40 ml. of acetone, and dried under vacuum. Yield, 1.6 g. of 7-(α-thienylacetamido)-3-(4′ - carbomethoxypyridinomethyl)-3-cephem-4-carboxylic acid, having maxima in its ultraviolet absorption spectrum at 226 and 263 mμ ($\epsilon$=18,600 and 12,030, respectively), and an antibiotic potency of 430 penicillin G units per milligram.

Example 9.—α-Thienylmethyl 3-cyanopyridine cephalosporin $C_A$ 7-(α-thienylacetamido)cephalosporanic acid sodium salt (3 g.) was dissolved in 150 ml. of water and adjusted to pH 2.8 with 1 N hydrochloric acid. To the solution was added 3-cyanopyridine (6 g.), and the mixture was heated at 40° C. for 17.5 hours. The reaction product mixture was evaporated to dryness under vacuum and the residue was triturated with acetone in 500 ml., 250 ml., and 250 ml. portions, then dried under vacuum.

The solid obtained thereby, weighing 2.69 g., was dissolved in 5.3 ml. of water and cooled to crystallize. The crystals were separated by decantation, triturated with 2 ml. of water, centrifuged and decanted, triturated with 10 ml. of acetone, decanted, and dried under vacuum. Yield, 0.47 g. of 7-(α-thienylacetamido)-3-(3'-cyanopyridinomethyl)-3-cephem-4-carboxylic acid, melting at 127–128° C. and having maxima in its ultraviolet absorption spectrum at 235 and 264 m$\mu$ ($\epsilon$=14,700 and 10,750, respectively), and an antibiotic potency of 407 penicillin G units per milligram.

Example 10.—α-Thienylmethyl pyridine cephalosporin $C_A$

A solution of 200 g. of sodium 7-(α-thienylacetamido) cephalosporanate, 100 g. of potassium thiocyanate, and 100 g. of pyridine in 500 ml. of water was adjusted to pH 6.5 with 10 ml. of syrupy phosphoric acid, then heated at 60° C. for 6 hours with stirring.

The reaction product mixture was cooled and washed with 25 percent Amberlite LA–1 (acetate form) in methyl isobutyl ketone, once with 1.0 liter and once with 0.75 liter, the contact time being about 20 minutes in each case. The washing was completed with 500 ml. of methyl isobutyl ketone.

The washed aqueous layer was seeded with crystals of 7-(α-thienylacetamido)-3-pyridinomethyl-3-cephem-4-carboxylic acid and refrigerated overnight. The crystalline solid obtained thereby was filtered off, washed twice with small volumes of cold water, then with an excess of ethyl ether, and dried under vacuum. Yield, 41 g. of 7-(α-thienylacetamido)-3-pyridinomethyl-3-cephem-4-carboxylic acid in the form of the inner salt.

*Analysis.*—Calc.: C, 54.92; H, 4.12; N, 10.11; S, 15.43. Found: C, 54.65; H, 4.37; N, 10.06; S, 14.31, 14.70.

The product had infrared absorption and nuclear magnetic resonance spectra consistent with the expected structure. It had an apparent molecular weight of 425 by titration and a p$K_a$ of 3.2. Its ultraviolet absorption spectrum had maxima at 239 and 252 m$\mu$ with molecular extinction coefficients of 15,160 and 13,950, respectively. It had an antibiotic potency of 1590 penicillin G units per milligram.

Example 11.—α-Thienylmethyl 3-(hydroxymethyl) pyridine cephalosporin $C_A$ 7-(α-thienylacetamido)-3-(3'-(hydroxymethyl)pyridinomethyl)-3-cephem-4-carboxylic acid was prepared by the reaction of 25 g. of 7-(α-thienylacetamido)cephalosporanic acid sodium salt with 25 g. of 3-(hydroxymethyl) pyridine in the presence of 25 g. of potassium thiocyanate according to the procedure of Example 3. The impure product weighed 11 g. Recrystallization of a 5 g. portion from water yielded 2.2 g. of purified product having maxima in its ultraviolet absorption spectrum at 236 and 260 m$\mu$ ($\epsilon$=15,050 and 13,290, respectively), and an antibiotic potency of 1000 penicillin G units per milligram.

Example 12.—α-Thienylmethyl 4-(hydroxymethyl) pyridine cephalosporin $C_A$ 7-(α-thienylacetamido)-3-(4'-(hydroxymethyl)pyridinomethyl)-3-cephem-4-carboxylic acid was prepared by the reaction of 25 g. of 7-(thienylacetamido)cephalosporanic acid sodium salt with 25 g. of 4-(hydroxymethyl)pyridine in the presence of 25 g. of potassium thiocyanate according to the procedure of Example 3. The product was principally an oil phase, which was separated, dissolved in water, and precipitated as a solid by dilution with acetone. The impure solid product thus obtained weighed 2.5 g. and had an antibiotic potency of 660 penicillin G units per milligram. The aqueous product phase, upon being cooled, deposited 1.5 g. of crystalline product having an antibiotic potency of 1180 penicillin G units per milligram, a maximum in its ultraviolet absorption spectrum at 234 m$\mu$ ($\epsilon$=17,000), and a shoulder at 260 m$\mu$ ($\epsilon$=11,500).

Example 13.—α-Thienylmethyl 4-picoline cephalosporin $C_A$ 7-(α-thienylacetamido)-3-(4'-picolinomethyl)-3-cephem-4-carboxylic acid, 12.7 g., was prepared by the reaction of 50 g. of 7-(α-thienylacetamido)cephalosporanic acid sodium salt with 25 g. of 4-picoline in the presence of 25 g. of potassium thiocyanate according to the procedure of Example 3. The product had a maximum in its ultraviolet absorption spectrum at 226 m$\mu$ ($\epsilon$=16,150), a shoulder at 260 m$\mu$ ($\epsilon$=11,200), and an antibiotic potency of 1360 penicillin G units per milligram.

Example 14.—α-Thienylmethyl 3-bromopyridine cephalosporin $C_A$ 7-(α-thienylacetamido)-3-(3'-bromopyridinomethyl)-3-cephem-4-carboxylic acid, 7 g., was prepared by the reaction of 25 g. of 7-(α-thienylacetamido)cephalosporanic acid sodium salt with 25 g. of 3-bromopyridine in the presence of 25 g. of potassium thiocyanate according to the procedure of Example 3. The product had maxima in its ultraviolet absorption spectrum at 232 and 266 m$\mu$ ($\epsilon$=17,000 and 11,400, respectively), and an antibiotic potency of 1100 penicillin G units per milligram.

Example 15.—α-Thienylmethyl 3-picoline cephalosporin $C_A$ 7-(α-thienylacetamido)-3-(3'-picolinomethyl)-3-cephem-4-carboxylic acid, 13.5 g., was prepared by the reaction of 50 g. of 7-(α-thienylacetamido)cephalosporanic acid sodium salt with 25 g. of 3-picoline in the presence of 25 g. of potassium thiocyanate according to the procedure of Example 3. The product had maxima in its ultraviolet absorption spectrum at 237 and 261 m$\mu$ ($\epsilon$=12,500 and 11,100, respectively), and an antibiotic potentcy of 1280 penicillin G units per milligram.

Example 16.—α-Thienylmethyl 3-acetylpyridine cephalosporin $C_A$ 7-(α-thienylacetamido)-3-(3'-acetylpyridinomethyl)-3-cephem-4-carboxylic acid, 1.5 g., was prepared by the reaction of 25 g. of 7-(α-thienylacetamido)cephalosporanic acid sodium salt with 25 g. of 3-acetylpyridine in the presence of 25 g. of potassium thiocyanate according to the procedure of Example 3. The product had maxima in its ultraviolet absorption spectrum at 230 and 261 m$\mu$ ($\epsilon$=16,390 and 12,000, respectively), and an antibiotic potency of 500 penicillin G units per milligram.

Example 17.—α-Thienylmethyl 3-iodopyridine cephalosporin $C_A$ 7-(α-thienylacetamido)-3-(3'-iodopyridinomethyl)-3-cephem-4-carboxylic acid, 4.7 g., was prepared by the reaction of 25 g. of 7-(α-thienylacetamido)cephalosporanic acid sodium salt with 25 g. of 3-iodopyridine in the presence of 25 g. of potassium thiocyanate according to the procedure of Example 3. The product had a maximum in its ultraviolet absorption spectrum at 230 m$\mu$ and a shoulder at 264 m$\mu$ ($\epsilon$=19,800 and 11,700, respectively), and an antibiotic potency of 1300 penicillin G units per milligram.

Example 18.—α-Thienylmethyl 3-fluoropyridine cephalosporin C_A

7 - (a - thienylacetamido) - 3 - (3' - fluoropyridinomethyl)-3-cephem-4-carboxylic acid, 4.5 g., was prepared by the reaction of 10 g. of 7-(α-thienylacetamido)cephalosporanic acid sodium salt with 10 g. of 3-fluoropyridine in the presence of 10 g. of potassium thiocyanate according to the procedure of Example 3. The product had maxima in its ultraviolet absorption spectrum at 237 and 261 m$\mu$ ($\epsilon$=13,250 and 12,200, respectively), and an antibiotic potency of 920 penicillin G units per milligram.

Example 19.—α-Thienylmethyl 3-chloropyridine cephalosporin C_A

7 - thienylacetamido) - 3 - (3' - chloropyridinomethyl)-3-cephem-4-carboxylic acid, 9.5 g., was prepared by the reaction of 25 g. of 7-(α-thienylacetamido)cephalosporanic acid sodium salt with 25 g. of 3-chloropyridine in the presence of 25 g. of potassium thiocyanate according to the procedure of Example 3. The product had maxima in its ultraviolet absorption spectrum at 235 and 265 m$\mu$ ($\epsilon$=13,760 and 11,300, respectively), and an antibiotic potency of 1000 penicillin G units per milligram.

Example 20.—α-Furylmethyl isonicotinamide cephalosporin C_A

A mixture of 6 g. of 7 - (α - furylacetamido)cephalosporanic acid (in the form of the free acid), 10 g. of isonicotinamide, and 100 ml. of water was heated at 50° C. for 20 hours, then cooled to room temperature. The reaction product mixture was washed with ethyl acetate, and the washed aqueous phase was evaporated to dryness at reduced pressure. The residue obtained thereby was triturated three times with acetone and dried. The crude product obtained thereby weighted 5.5 g. and had an antibiotic potency of 90 penicillin G units per milligram.

A 5-gram portion of the crude product was dissolved in 500 ml. of water, overlayered with 500 ml. of ethyl acetate, adjusted to pH 2 with aqueous 5 percent sulfuric acid, and filtered. The filtrate layers were separated. The aqueous layer was washed with ethyl acetate, stripped free of ethyl acetate at reduced pressure, and adjusted to pH 4.5 with aqueous 5 percent barium hydroxide solution, whereby substantially all sulfate was precipitated as barium sulfate, leaving essentially no inorganic materials in solution. To the resulting slurry were added a quantity of activated charcoal and of diatomaceous earth filter acid, and the mixture was filtered. The filtrate was concentrated at reduced pressure to small volume. From the concentrate was obtained crystalline 7-(α-furylacetamida)-3-(4'-carbamylpyridinomethyl)-3-cephem-4-carboxylic acid, 250 mg., having maxima in its ultraviolet absorption spectrum at 213 and 262 m$\mu$ ($\epsilon$=18,400 and 14,100, respectively), and an antibiotic potency of 365 penicillin G units per milligram.

The compounds of the present invention are characterized by resistance to the destructive action of penicillinase, minimal toxicity, high activity against a broad range of Gram-positive pathogens, lower but effective activity against many of the Gram-negative pathogens, and prolonged action upon intramuscular injection, extending for periods of twelve hours or more (three times the duration of the 3-acetoxymethyl analogues), up to as much as seven to fourteen days or more in the case of the less soluble species.

The compounds are highly effective against penicillin-resistant Staphylococcus aureus, and many of the compounds are, surprisingly, more effective in the presence of blood serum than its absence. The following table lists the minimum inhibitory concentration (MIC) ranges of the compounds of the operating examples, both in the presence and in the absence of human blood serum, against four clinical isolates of penicillin-resistant S. aureus, as measured by the gradient-plate technique:

| Example Number | MIC, $\mu$g./ml. | |
|---|---|---|
| | Without serum | With serum |
| 1 | 0.4–0.9 | 0.3–0.5 |
| 2 | 0.2 | 0.1 |
| 3 | 0.9–3.4 | 1.5–4.3 |
| 4[1] | 0.4 | 0.2–0.3 |
| 5[1] | <0.1–0.2 | <0.1 |
| 6[1] | 0.3–0.4 | 0.3–0.4 |
| 7[1] | 0.4–0.5 | 0.4–0.5 |
| 8[1] | 0.6–1.3 | 0.7–1.0 |
| 9 | 0.3–0.5 | 0.7–1.0 |
| 10 | 0.4 | 0.3 |
| 11 | 0.4–1.9 | 0.2–0.9 |
| 12 | 1.8–3.1 | 0.6–1.3 |
| 13 | 1.2–4.6 | 0.8–1.6 |
| 14 | <0.1–0.2 | <0.1–0.1 |
| 15 | 0.6–4.8 | 0.3–1.2 |
| 16 | 0.1–0.4 | <0.1–0.2 |
| 17 | No data | No data |
| 18 | 0.1–0.2 | <0.1–0.2 |
| 19 | 0.1–0.3 | 0.1–0.2 |
| 20 | 0.7–1.2 | 0.6–1.0 |

[1] This test carried out on another preparation of the subject compound.

The compounds are also highly effective against the hemolytic streptococci, as demonstrated by the following table, which gives the median effective dose (ED$_{50}$) against $\beta$-hemolytic Streptococcus Strain C203 in mice, administered orally 1 hour after infection and again 4 hours later.

| Example No.: | ED$_{50}$, mg./kg. ×2 |
|---|---|
| 1 | 1.05 |
| 2[1] | 2.04 |
| 3[1] | 21–41 |
| 4[1] | 3.97 |
| 5[1] | 1.92 |
| 6[1] | 1.8 |
| 7 | No data |
| 8 | 1.39 |
| 9 | 2.6 |
| 10 | <1.1 |
| 11[1] | <2.5 |
| 12 | 0.58 |
| 13 | 0.62 |
| 14 | 0.81 |
| 15 | 0.86 |
| 16 | 2.3 |
| 17 | No data |
| 18 | 0.88 |
| 19 | 0.79 |
| 20 | 2.6 |

[1] This test carried out on another preparation of the subject compound.

A high degree of activity is also shown by the compounds of the present invention against many of the Gram-negative pathogens. The following table gives the minimum inhibitory concentrations of the compounds of the operating examples against a number of Gram-negative organisms, as measured by the gradient-plate technique:

| Example | Minimum inhibitory concentration (MIC), $\mu$g./ml. | | | | | | | | | | | | | | | | | | | |
|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 |
| Organism: | | | | | | | | | | | | | | | | | | | | |
| Shigella sonnei | 4 | 5.3 | 14.3 | 7.1 | 3.6 | 5.6 | 5.7 | 8 | 15 | 3.8 | 4.6 | 4.6 | 1 | 4.4 | 3.9 | 7 | 5.4 | 7.1 | 7.1 | 9.2 |
| Shigella N–9 [1] | 3.6 | 9.2 | 57.5 | 17.8 | 8.1 | 11.8 | 12.2 | 43 | 44 | 5.6 | 9.2 | 16.8 | 13.1 | 14.5 | 9.0 | 46.3 | 11.8 | 34.2 | 13.6 | 14.0 |
| E. coli N–10 [1] | 5 | 4.6 | 13.6 | 8.3 | 3.3 | .5 | 5.6 | 8 | 15 | 2.8 | 4.5 | 4.1 | 2.8 | 4.4 | 4.0 | 8.8 | 4.4 | 7.2 | 6.2 | 9.6 |
| E. coli N–26 [1] | 4 | 4.2 | 13.2 | 9.6 | 3.5 | 5.4 | 5.9 | 7 | 15 | 2.4 | 4.2 | 4.4 | 3.2 | 4.6 | 3.8 | 8.2 | 3.8 | 7.5 | 6.8 | 9.2 |
| Klebsiella pneumoniae | 4 | 5.7 | 20.1 | 8.2 | 5.8 | 6.1 | 6.8 | 10 | 11 | 4.5 | 4.8 | 4.2 | 3.3 | 5.1 | 5.8 | 7.4 | 6.1 | 10.9 | 9.6 | 9.7 |
| Aerobacter aerogenes | 4 | 6.4 | 4.8 | 6.6 | 5.2 | 7.5 | 7.8 | 2 | 13 | 3.8 | 5.1 | 5 | 3.6 | 6.2 | 5.8 | 10.3 | 6.9 | 9.1 | 8.3 | 8.1 |

[1] Clinical isloate.

I claim:
1. The compounds having the following formula:

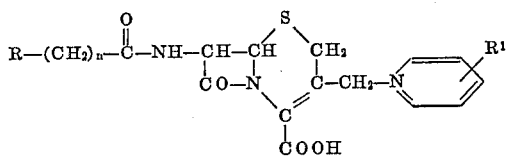

wherein R is a member of the group consisting of α-thienyl, β-thienyl, α-furyl, and β-furyl; $n$ is 0 or 1; $R^1$ is a member of the group consisting of hydrogen, methyl, ethyl, hydroxy, hydroxymethyl, trifluoromethyl, halo, cyano, carboxy, carbo($C_1$–$C_4$)alkoxy, ($C_1$–$C_4$)alkanoyl, ($C_1$–$C_4$) alkanoyloxy, and

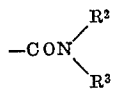

attached to the pyridine ring in the 3 and 4 positions; $R^2$ is a member of the group consisting of hydrogen, methyl, ethyl, and cyclopropyl; and $R^3$ is a member of the group consisting of hydrogen, methyl, and ethyl.

2. 7 - (α - thienylacetamido) - 3 - (4' - carbamylpyridinomethyl)-3-cephem-4-carboxylic acid.
3. 7 - (α - thienylacetamido) - 3 - (3' - carbamylpyridinomethyl)-3-cepham-4-carboxylic acid.
4. 7 - (α - thienylacetamido) - 3 - (4' - cyanopyridinomethyl)-3-cephem-4-carboxylic acid.
5. 7 - (α - thienylacetamido) - 3 - (4' - carbomethoxypyridinomethyl)-3-cephem-4-carboxylic acid.
6. 7 - (α - thienylacetamido) - 3 - pyridinomethyl - 3-cephem-4-carboxylic acid.
7. 7 - (α - thienylacetamido) - 3 - (3' - (N" - methylcarbamyl)pyridinomethyl)-3-cephem-4-carboxylic acid.
8. 7 - (α - thienylacetamido) - 3 - (4' - (N" - methylcarbamyl)pyridinomethyl)-3-cephem-4-carboxylic acid.
9. 7 - (α - thienylacetamido) - 3 - (4' '- acetylpyridinomethyl)-3-cephem-4-carboxylic acid.
10. 7 - (α - thienylacetamido) - 3 - (3' - hydroxymethyl)pyridinomethyl)-3-cephem-4-carboxylic acid.
11. 7 - (α - thienylacetamido) - 3 - (4' - (hydroxymethyl)pyridinomethyl)-3-cephem-4-carboxylic acid.
12. 7 - (α - thienylacetamido) - 3 - (3' - methylpyridinomethyl)-3-cephem-4-carboxylic acid.
13. 7 - (α - thienylacetamido) - 3 - (4' - methylpyridinomethyl)-3-cephem-4-carboxylic acid.
14. 7 - (α-thienylacetamido) - 3 - (3' - bromopyridinomethyl)-3-cephem-4-carboxylic acid.
15. 7 - (α - furylacetamido) - 3 - (4' - carbamylpyridinomethyl)-3-cephem-4-carboxylic acid.

No references cited.

NICHOLAS S. RIZZO, *Primary Examiner.*

U.S. Cl. X.R.

260—999